United States Patent
Taga et al.

(10) Patent No.: US 7,393,019 B2
(45) Date of Patent: Jul. 1, 2008

(54) TUBE CONNECTION ASSEMBLY

(75) Inventors: Masayuki Taga, Aichi-ken (JP); Hiroshi Yamaguchi, Aichi-ken (JP); Keiji Ishiguro, Aichi-ken (JP); Shigeo Ohi, Aichi (JP); Kazuyoshi Murase, Aichi (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 11/492,219

(22) Filed: Jul. 25, 2006

(65) Prior Publication Data
US 2007/0026703 A1    Feb. 1, 2007

(30) Foreign Application Priority Data
Jul. 26, 2005    (JP) .............................. 2005-215838

(51) Int. Cl.
*F16L 39/00* (2006.01)
(52) U.S. Cl. ...................................... 285/321
(58) Field of Classification Search ................. 285/321
See application file for complete search history.

(56) References Cited

U.S. PATENT DOCUMENTS

| | | | | |
|---|---|---|---|---|
| 472,342 | A * | 4/1892 | Draudt | 285/317 |
| 3,207,535 | A * | 9/1965 | Wilson | 285/86 |
| 3,428,340 | A * | 2/1969 | Pelton | 285/95 |
| 3,773,360 | A * | 11/1973 | Timbers | 285/307 |
| 4,007,953 | A * | 2/1977 | Powell | 285/321 |
| 4,804,206 | A * | 2/1989 | Wood et al. | 285/13 |
| 5,226,682 | A * | 7/1993 | Marrison et al. | 285/308 |
| 5,876,071 | A * | 3/1999 | Aldridge | 285/321 |
| 5,882,044 | A * | 3/1999 | Sloane | 285/92 |
| 6,474,698 | B2 * | 11/2002 | Dobler et al. | 285/321 |
| 6,554,322 | B2 * | 4/2003 | Duong et al. | 285/305 |
| 6,983,958 | B2 * | 1/2006 | Rautureau | 285/305 |
| 6,997,486 | B2 * | 2/2006 | Milhas | 285/305 |
| 7,201,403 | B2 * | 4/2007 | Takayanagi et al. | 285/321 |
| 2001/0002754 | A1 * | 6/2001 | Dobler et al. | 285/321 |
| 2001/0049078 | A1 * | 12/2001 | Long | 431/100 |

FOREIGN PATENT DOCUMENTS

JP    A-06-050482    6/1999

* cited by examiner

*Primary Examiner*—James M Hewitt
(74) *Attorney, Agent, or Firm*—Posz Law Group, PLC

(57) ABSTRACT

A tube connection assembly comprises a male member, a female member and a mating member. The male member is provided with a retaining part that is formed with a non-circular cross-section on the outer peripheral part of a male body. The mating member is held by the retaining part, is formed from an elastic material having a C-shape, and has, on a portion thereof, mating parts. The female member is provided with a receiving part in which the male member is inserted, and mating holes and formed through the receiving part. The mating member is held, so as to prevent rotation, by a base part of a retaining part that has a non-circular cross-section as a part of the outer peripheral part of the male body, and decreases or increases in diameter in the radial direction to mate with the female member through insertion into the mating holes.

5 Claims, 4 Drawing Sheets

TUBE CONNECTION ASSEMBLY

This application claims the benefit of and priority from Japanese Application No. 2005-215838 filed Jul. 26, 2005, the content of which is incorporated herein by reference.

BACKGROUND OF THE INVENTION

1. Field of the Invention

The present invention relates to a tube connection assembly for connecting hoses or pipes that carry fluids.

2. Description of the Related Art

Conventional, a tube connection assembly has been known in JP-A-6-50482. The tube connection assembly has interposed a mating member between a male member and a female member that are connected to pipes or hoses, to connect together the male member and the female member. The mating member is formed by bending, for example, a C-shaped steel wire, or the like, and attaching to the outer peripheral part of a male member, which is circular in its cross-section. When the male member is inserted into the female member in order to connect the male member and the female member, the mating member, fastened to the outer periphery of the male member, is compressed by the inner wall of the female member, and then expands in the radial direction when a mating groove that is formed on the inner peripheral part of the female member is reached, causing the male member and the female member to be locked together by the mating member.

However, in the conventional tube connection assembly, a complex die structure is required to fabricate the mating groove on the inner peripheral part of the female member, causing difficulties in manufacturing. Moreover, because steel wire, or the like, that can be subjected to elastic deformation is used in the mating member, it is difficult to maintain the tolerances of the part that catches, by protruding into the mating groove, within a specific range, and hence there has been a problem with difficulty in insuring a specific mating force. Moreover, while the C-shaped mating member must prevent rotation of the positioning on the outer peripheral part of the male member, the structure to do so is complex, and there has also been a problem in difficulty in the positioning operations.

SUMMARY

An advantage of some aspects of the invention is to provide a tube connection assembly that can, using a simple structure, hold the mating member on the male member, that can set easily a specific value for the mating-force between the male member and the female member, and that can simplify the die structure.

The present invention for connecting a male member to a female member comprises a male member that has a flow path that connects to a tube, a female member that has a flow path that connects to another tube, and a mating member that is interposed between the male member and the female member. The male member is provided with a tube-shaped male body that forms a flow path, and a retaining part that is formed on the outer peripheral part of the male body. The mating member is held by the retaining part, and is provided with a mating part, formed into a C-shape from an elastic member, with a portion thereof mating with the female member. The female member is provided with a tube-shaped female body forming a flow path, a receiving part, formed at an opening end part of the female body, into which the male member is fitted, and a mating hole, formed passing through the receiving part, into which the mating part of the mating member, supported on the male member, is inserted in the radial direction. The retaining part has a rotational locking part for preventing the rotation of the mating member, where the mating member is formed so as to mate with the female member through insertion into the mating hole by decreasing or increasing size in the radial direction in a state that is rotationally locked by the rotational locking part.

In the tube connection assembly according to the present invention, the mating member is held on the retaining part of the male member when the tube is being installed. At this time, when the mating member is held by the rotational locking part of the retaining part, the mating part is held in a state wherein the male body protrudes from the outer peripheral part. When the tip end of the male member is inserted into the opening in the receiving part of the female member, the mating part of the mating member is compressed, acting against an elastic force, and when the mating part reaches the mating hole, the elastic force on the mating member is released to mate with the mating hole. This causes the male member to be connected to the female member, with the connecting member interposed therebetween, through mating with the female member in the axial and radial directions.

Consequently, given the two connection assembly, the mating member, at the time that the tube is installed, reduces and increases in size in the radial direction, supported in a stabilized state by the rotational locking part of a support part that is not circular in its cross-section, eliminating the need for troublesome operations for positioning the mating member, providing superior ease of operation.

Moreover, the mating part of the mating member is configured to mate with the female member through insertion into a mating hole that is formed through the receiving part of the female member, making it possible to simplify the structure by eliminating the need for high dimensional precision in, for example, the depth of the retaining groove in the female member in order to maintain the amount of material in the mating member that catches in the female member within a specific range, as described in the conventional technology.

Furthermore, the mating hole in the female member can be manufactured easily using an extrusion molding method using a slide die, or manufactured using a drilling/machining method, because the structure is one wherein a portion of the receiving part forms a through hole, and thus there is superior manufacturability.

As a preferred form of the present invention, the rotational locking part is provided with a base part wherein a portion of the outer peripheral part of the male member has a non-circular cross-sectional shape, where the mating member can be structured to form a foundation part at the base part. This structure makes it easy to structure the rotational locking part of the mating member.

In yet another preferred form of the present invention, the mating member comprises a foundation part that is formed into essentially the center of a C-shape, and hooks for applying, to the mating parts that are formed on each of the open ends of the C-shape a force to reduce the diameter or to increase the diameter, where the rotational locking part is provided with a base part, which supports the foundation part, as a part of the male member wherein the outer periphery is not circular in its cross-sectional shape, and a mating surface for preventing the rotation of the mating member by supporting each of the hooks.

Furthermore, as a preferred structure for the mating member, the foundation part is formed so as to control the elastic deformation even when a force is received that causes a decrease or increase in size in the radial direction is applied to the mating member, where the mating part is configured to either increase or decrease in size in the radial direction, with both ends of the foundation part as pivot points, where, additionally, the mating part is configured to increase or decrease in size in the radial direction, in a direction that is essentially perpendicular to the direction wherein the mating part is connected to the foundation part and the hook.

These and other objects, features, aspects, and advantages of the present invention will become more apparent from the following detailed description of the preferred embodiments with the accompanying drawings.

DESCRIPTION OF THE PREFERRED EMBODIMENTS

Next, preferred examples of embodiment according to the present invention will be explained in order to further explain the structure and operation of the present invention.

(1) Schematic Structure of the Tube Connection Assembly

Figure 1:
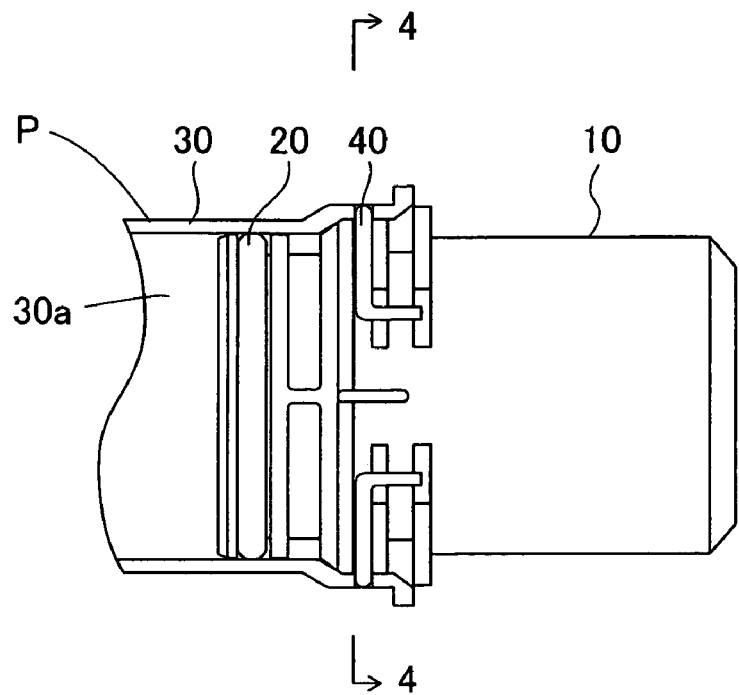
FIG. 1 is a partial cutaway side view of a tube connecting assembly according to an embodiment according to the present invention.

FIG. 1 is a partial cutaway side view of a tube connection assembly according to an embodiment according to the present invention. In FIG. 1, the tube connection assembly is used in, for example, radiator hoses in automobile engines, and is provided with a cylindrical male member 10, an O-ring 20, a female member 30 that is formed on the end part of a pipe P, and a mating member 40, where the O-ring 20 and a mating member 40 are equipped on the male member 10. The mating member 40, installed on the male member 10, mates with the female member 30 to connect the male member 10 to the female member 30.

(2) Structure of Each Part

Figure 2:
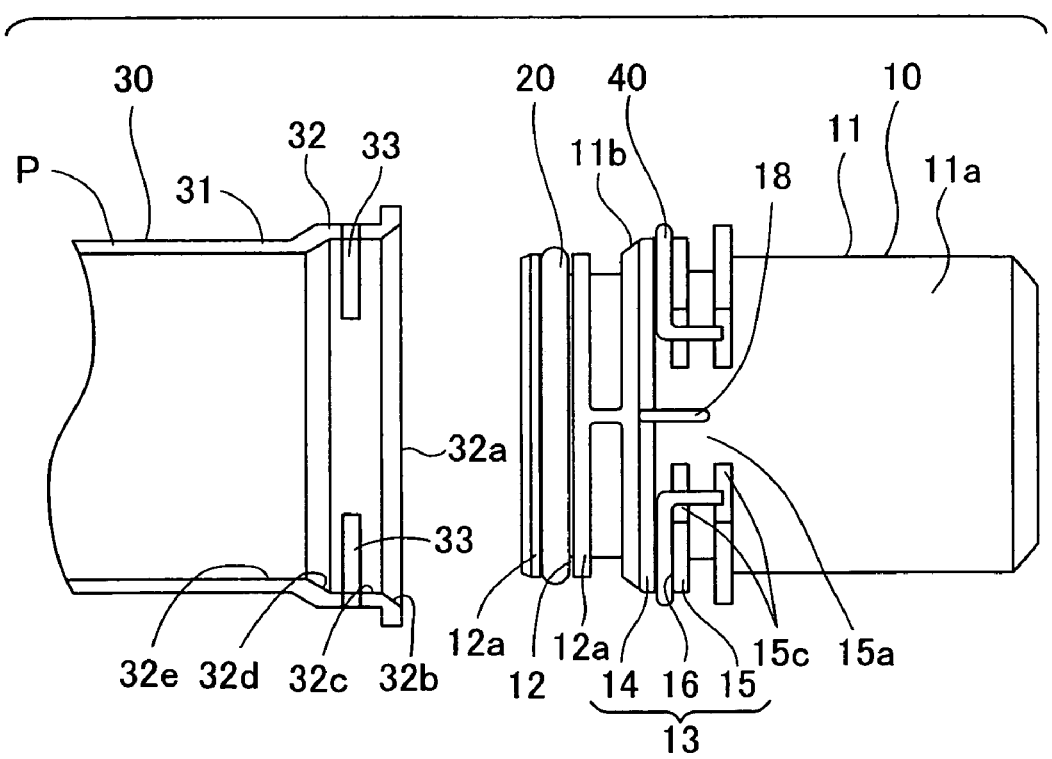
FIG. 2 is a side view illustrating the state prior to connecting the tube connection assembly.
Figure 3:
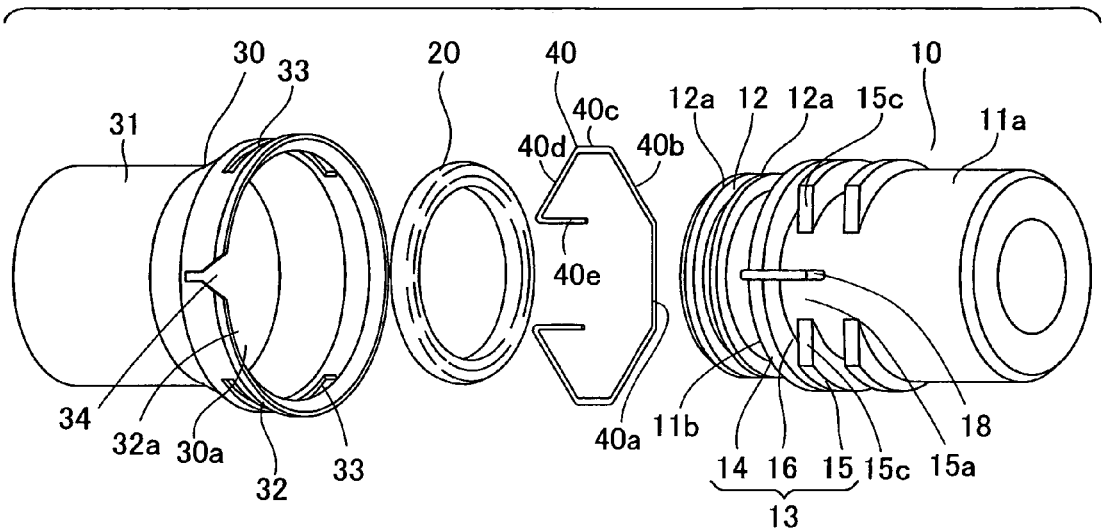
FIG. 3 is a perspective view illustrating the state prior to connecting the tube connection assembly.
Figure 4:
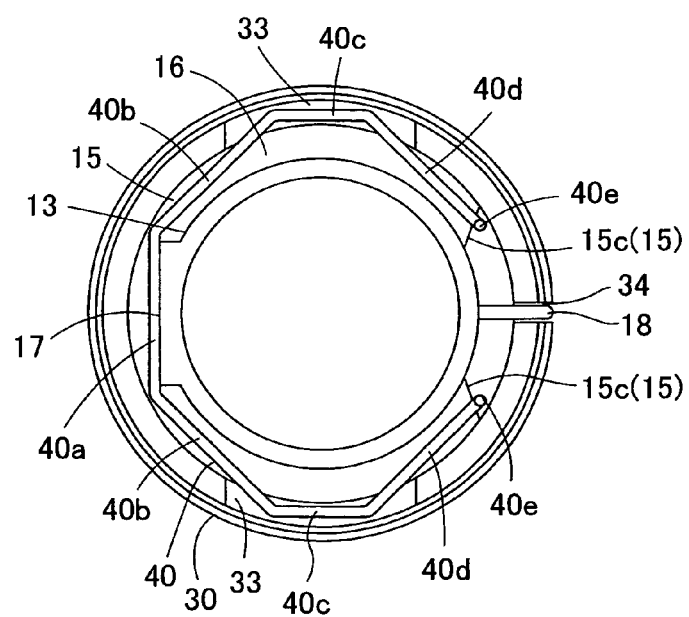
FIG. 4 is a cross-sectional view along the section 4-4 in FIG. 1.

FIG. 2 is a side view showing the state of the tube connection assembly prior to making the connection, and FIG. 3 is a perspective view of the state of the tube connection assembly prior to making the connection. Note that in FIG. 2 the male member 10 is shown in a perspective view, and the female member 30 is shown in cross-section. The male member 10 is provided with an essentially cylindrical male body 11 that forms a flow path. A nipple 11a that inserts into a hose is formed on the outer peripheral part on one end of the male body 11, and an O-ring groove 12, that holds the O-ring 20, and a retaining part 13, that holds the mating member 40, are formed on the outer peripheral part on the other end of the male body 11. The O-ring groove 12 is formed from ring-shaped ridges 12a and 12a that protrude, parallel to each other, from the outer peripheral part of the male body 11. The retaining part 13 is provided with a ring-shaped protruding part 14 that protrudes from the outer peripheral part of the male body 11, and a protruding part 15 that is parallel to the protruding part 14. The protruding part 15 is essentially C-shaped, with an opening part 15a as a notch in one part, where the two facing end parts in the opening part 15a form angled mating surfaces 15c and 15c. FIG. 4 is a cross-sectional drawing along the section 4-4 in FIG. 1. The retaining part 13 is provided with a trapezoidal base part 17 (rotational locking part) from one part of the circular cross-section, which is a position that supports the mating member 40. In FIG. 3, a stopper 18 is equipped protruding along the axial direction, mating with the female member 30, in the opening part 15, which is the outer peripheral part of the male body 11 in FIG. 3. Moreover, the tip part of the male body 11 is a taper surface 11b with a narrower diameter further towards the tip end from the retaining part 13.

In FIG. 2, the female member 30 is provided with a cylindrical female body 31 that is integrated with the pipe P, and a receiving part 32 wherein the diameter has been increased from the female body 31. The receiving part 32 is formed in a flair shape facing the taper surface 11b of the male member 10, provided with an insertion guide surface 32b with a reduced diameter, a cylindrical support part 32c, an inclined part 32d with a reduced diameter, and a cylindrical surface 32e, in order, beginning on the opening 32a side. Mating holes 33 and 33 are formed in two locations in the support part 32c, 180° apart from each other. These mating holes 33 and 33 are formed in such a way that a portion of the mating member 40 can be inserted therein. Moreover, a notch 34, facing in the axial direction as shown in FIG. 3, is formed in the opening 32a of the receiving part 32. This notch 34 is formed so as to be able to receive the stopper 18 on the male member 10 side, to prevent rotation of the male member 10 and the female member 30.

The mating member 40 is that which prevents the male member 10 and the female member 30 from coming apart, and is formed through bending a steel wire into the shape of an octagon (a C-shape) that is larger than the outer diameter of the retaining part 13. That is, as shown in FIG. 4, the mating member 40 is provided with a foundation part 40a that is supported on the base part 17 of the retaining part 13 and is formed on the edge at essentially the center part of the octagon, angled parts 40b and 40b, mating parts 40c and 40c, angled parts 40d and 40d, and hooks 40e and 40e that protrude facing in the axial direction from the open edge. The hooks 40e and 40e apply a force that either decreases or increases the size in the radial direction (in the vertical direction the figure) with the fingers. The hooks 40e and 40e position the mating member 40 relative to the mating part 13 by applying pressure to the mating surfaces 15c and 15c of the protruding part 15.

(3) Operations for Connecting the Tube Connection Assembly

Figure 5:
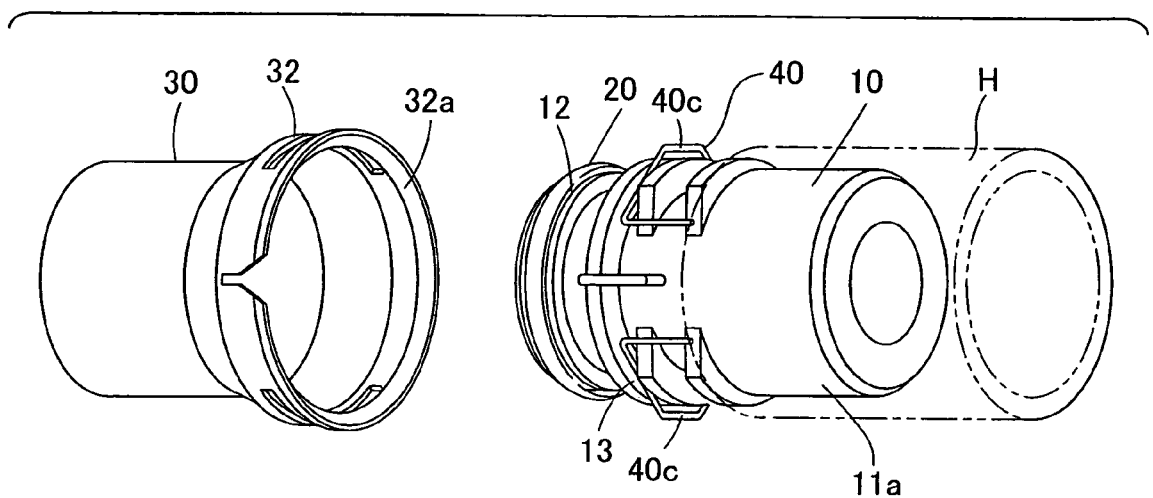
FIG. 5 shows the connection operation in the tube connection assembly.
Figure 6:
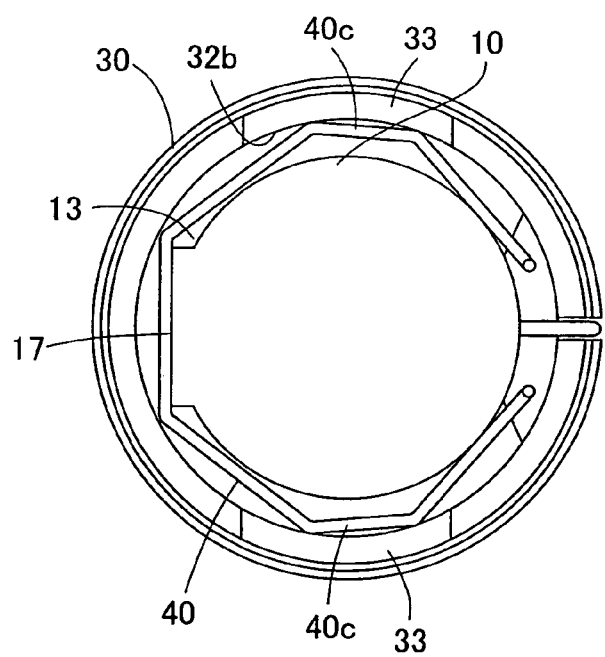
FIG. 6 shows the connection operation in the tube connection assembly.
Figure 7:
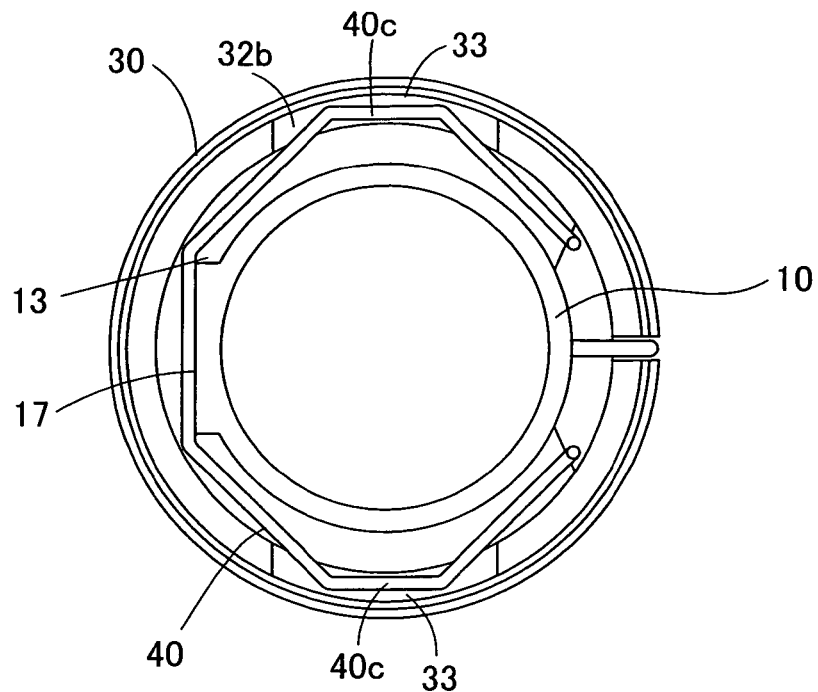
FIG. 7 shows the connection operation following FIG. 6.

In the tube connection assembly, an O-ring 20 is held by an O-ring groove 12, and a mating member 40 is held on the retaining part 13 of the male member 10 against the elastic force of the mating member 40, as shown in FIG. 5, when the tube is installed, and the hose H is inserted into the nipple 11a. At this time, in the mating member 40, not only is a foundation part 40a supported on the base part 17 (as shown in FIG. 4), but also the hooks 40e and 40e apply pressure on the mating surfaces 15c and 15c, to hold the mating parts 40c and 40c in a protruding state by the force of the elastic restitution thereof. Moreover, the tip side of the male member 10 is inserted, relatively, from the opening 32a of the receiving part 32 of the female member 30. As shown in FIG. 6, this causes the mating parts 40c and 40c of the mating member 40 to be compressed, against the elastic force, guided by the insertion guide surfaces 32b of the female member 30, so that, as shown in FIG. 7, when the mating holes 33 and 33 have been reached, the elastic force of the mating member 40 is released, causing mating with the mating holes 33 and 33. This causes the male member 10 to mate in the axial direction and the radial direction with the female member 30, with the mating member 40 interposed therebetween.

In the tube connection assembly, wherein installation has been completed in this way, the O-ring 20 secures a watertight state between the O-ring groove 12 and the inner wall surface of the female member 30, as shown in FIG. 1, where the fluid can move through the flow path of the male member 10 and the flow path of the female member 30. At this time, if the male member 10 were to be pulled in the direction of removal from the female member 30, or if an external force were to act in a direction perpendicular to the axis between the male member 10 and the female member 30, the male member 10 would be held strongly by the female member 30 and the mating member 40, so that the male member 10 would be held stably within the female member 30 by some degree of tensile force or external force as well.

Moreover, when a user wishes to remove the male member 10 from the female member 30, the user either pinches the hooks 40e and 40e of the mating member 40 with the fingers, or uses a tool to push the hooks 40e and 40e together to cause the mating member 40 to decrease in size in the radial direction against the elastic force thereof. This causes the mating member 40 to release the mating with the mating holes 33 and 33 of the female member 30, making it possible for the user to remove the male member 10 from the female member 30. Consequently, the tube connection assembly according to the embodiment makes it possible to connect a tube quickly, and has high reliability in the tube connections.

(4) Operation and Effects of the Tube Connection Assembly

The embodiment has the following operation and effects.

(4)-1 Given the tube connection assembly, when installing a tube, the mating member 40 is held by the base part 17 of the retaining part 13, which is non-circular in its cross-section, and decreases and increases in size in the radial direction, and thus difficult operations for positioning the mating member 40 are unnecessary, so the tube connection assembly has superior operability.

(4)-2 The mating parts 40c and 40c of the mating member 40 are inserted into the mating holes 33 and 33, which are formed through the receiving part 32 of the female member 30, to mate with the female member 30, and thus the structure is simple and high dimensional precision in terms of the depth of the retaining groove in the male member, which has been required in the conventional technology so that the amount of material of the mating member 40 that catches the female member 30 will be within a prescribed range, is unnecessary.

(4)-3 Because the structure is such that the mating holes 33 and 33 of the female member 30 are formed through a portion of the receiving part 32, the manufacturing can be done simply using an injection molding process with a slide mold, or using a drilling or machining process, for superior productivity.

(5) The present invention is not limited to the embodiment described above, but rather may be embodied in a variety of forms without deviating from the spirit or intent thereof, and, for example, may be modified as described below.

Figure 8:
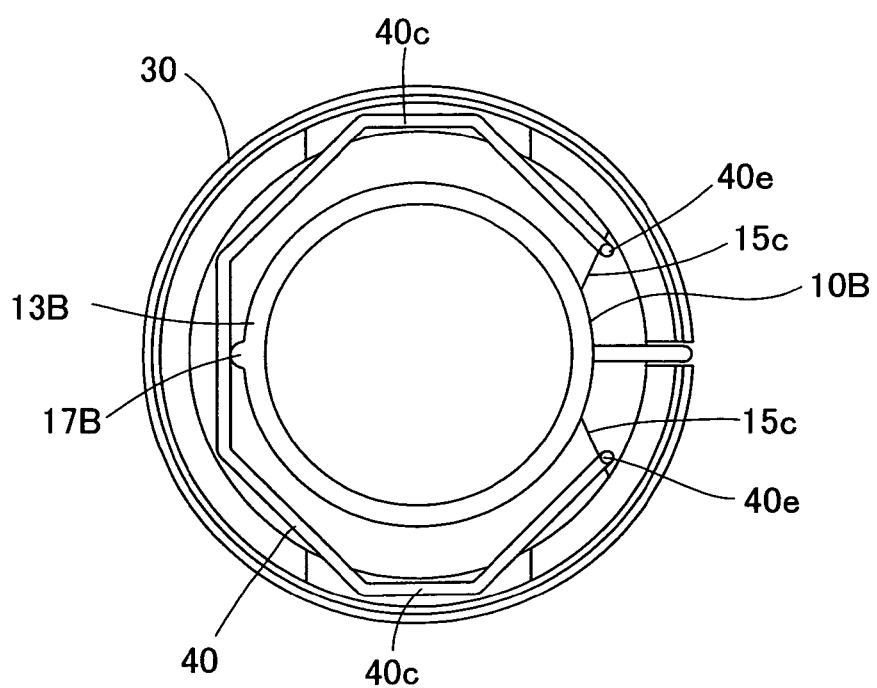
FIG. 8 shows a tube connection assembly according to another embodiment.

(5)-1 If the rotational locking part of the retaining part has a structure able to position the mating unit, then, while not limited thereto, the structure may be such that a base part 17B, having a circular cross-section, is provided protruding from one end of a retaining part 13B, such as shown by the male member 10B in FIG. 8, where the mating unit 40 is supported on the base part 17B and the rotation is prevented by the mating surfaces 15c by the hooks 40e and 40e of the mating member 40, or the structure may be such that a foundation part that is built into a U shape is formed on one part of the mating member, and the rotation is prevented by an indented place that mates with this foundation part, or by a protruding part and a hook.

(5)-2 Although the mating member according to the embodiment set forth above, has an octagonal cross-section, there is no particular limitation on the shape insofar as the shape encompasses the outer peripheral surface of the male body.

(5)-3 While in the embodiment set forth above, the explanation was for a tube connection assembly for an engine cooling system, the present invention is not limited thereto, but rather can be applied to other places, such as a fuel system. In this case, the O-ring and seal members will each use two members, one for high temperatures and one for low temperatures.

The foregoing detailed description of the invention has been provided for the purpose of explaining the principles of the invention and its practical application, thereby enabling others skilled in the art to understand the invention for various embodiments and with various modifications as are suited to the particular use contemplated. The foregoing detailed description is not intended to be exhaustive or to limit the invention to the precise embodiments disclosed. Modifications and equivalents will be apparent to practitioners skilled in this art and are encompassed within the spirit and scope of the appended claims.

What is claimed is:

1. A tube connection assembly comprising a male member including a flow path connected to a tube, a female member joined with the male member and including a flow path connected to another tube, and a mating member interposed between the male member and the female member, wherein the male member includes (i) a cylindrical male body and (ii) a retaining part that is formed on an outer peripheral part of the male body, the retaining part including a rotational locking part for preventing rotation of the mating member, the mating member is formed from an elastic material in a C-shape and held on the retaining part, the mating member including a mating part that mates with a portion of the female member, and the female member includes (i) a cylindrical female body, (ii) a receiving part that is formed on an opening end part of the female body and fits with a part of the male member, and (iii) a mating hole that is formed through the receiving part for mating with the mating part of the mating member in a radial direction, wherein the mating member is configured such that in a state where the rotation of the mating member is locked by the rotational locking part, the diameter of the mating member increases, and then the mating part protrudes into the mating hole, wherein the mating member includes (i) a foundation part formed in essentially a center part of the C-shape, and (ii) hooks that apply a force that reduces and increases the diameter of the mating member, and are formed at an opening of the C-shape respectively, and wherein the rotational locking part includes (i) a base part that conforms to the foundation part and supports the foundation part and is formed in a non-circular cross-section on an outer part of the male member, and (ii) a mating surface that prevents the rotation of the mating member through supporting the hooks respectively.

2. The tube connection assembly in accordance with claim 1, wherein the C-shape of the mating member is an octagon-shape with an opening, and the mating part is a side that is disposed in a direction that is essentially perpendicular to a line where the foundation part is connected with the opening.

3. The tube connection assembly in accordance with claim 1, wherein when a force for reducing and enlarging the diameter of the mating member is applied to the mating member, the mating part is configured to deform elastically larger than the foundation part and to increase the diameter of the mating member in the radial direction.

4. The tube connection assembly in accordance with claim 3, wherein the radial direction is essentially perpendicular to the direction in which the foundation part is disposed relative to the hooks.

5. The tube connection assembly in accordance with claim 1, wherein the receiving part includes a notch formed in an axial direction, and the male member includes a stopper mating with the notch to prevent the rotation of the male member and the female member.

* * * * *